United States Patent [19]
Grout et al.

[11] 3,800,985

[45] Apr. 2, 1974

[54] SYSTEM AND METHOD FOR DISTRIBUTING HIGHLY VISCOUS MOLTEN MATERIAL

[75] Inventors: Kenneth M. Grout, Topsfield; Richard D. Devellian, Rockport, both of Mass.

[73] Assignee: Kenics Corporation, Danvers, Mass.

[22] Filed: Apr. 15, 1971

[21] Appl. No.: 134,317

[52] U.S. Cl. ............... 222/146 H, 138/38, 259/4, 425/204, 425/DIG. 49
[51] Int. Cl. ..................... B29f 3/02, B29f 3/08
[58] Field of Search ......... 259/4; 425/DIG. 49, 382, 425/463, 464, 202, 204; 138/38; 222/331, 330, 146 H, 459

[56] References Cited
UNITED STATES PATENTS

| | | | |
|---|---|---|---|
| 3,582,045 | 6/1971 | Leybourne | 138/38 X |
| 3,297,305 | 1/1967 | Walden | 259/4 |
| 3,496,261 | 2/1970 | Parr | 425/463 X |
| 3,286,992 | 11/1966 | Armeniades | 259/4 |
| 3,328,003 | 6/1967 | Chisholm | 425/DIG. 49 |
| 3,513,908 | 5/1970 | Singh | 138/38 X |
| 3,635,444 | 1/1972 | Potter | 259/4 |
| 3,477,097 | 11/1969 | Plymale | 222/330 X |

FOREIGN PATENTS OR APPLICATIONS

| | | | |
|---|---|---|---|
| 1,209,603 | 10/1970 | Great Britain | 259/4 |

*Primary Examiner*—Stanley H. Tollberg
*Assistant Examiner*—Frederick R. Handren

[57] ABSTRACT

A system for distributing a highly viscous molten material such as a molten polymer. The system includes means for heating the material to a molten state and moving it through a special mixing structure located just ahead of one or more output ports leading to a further processing system including a filament spinnerette. The mixing structure includes a conduit containing a plurality of sheet-like elements extending longitudinally within the conduit, each element being curved to turn the direction of the material flowing past it. The elements are arranged in alternating right and left-handed curvature groups (a group consisting of one or more elements). The conduit is in contact with a heat exchange medium to maintain the polymer at its proper molten temperature. A modification for distributing molten glass is also disclosed as being substantially the same as for the molten polymer.

3 Claims, 5 Drawing Figures

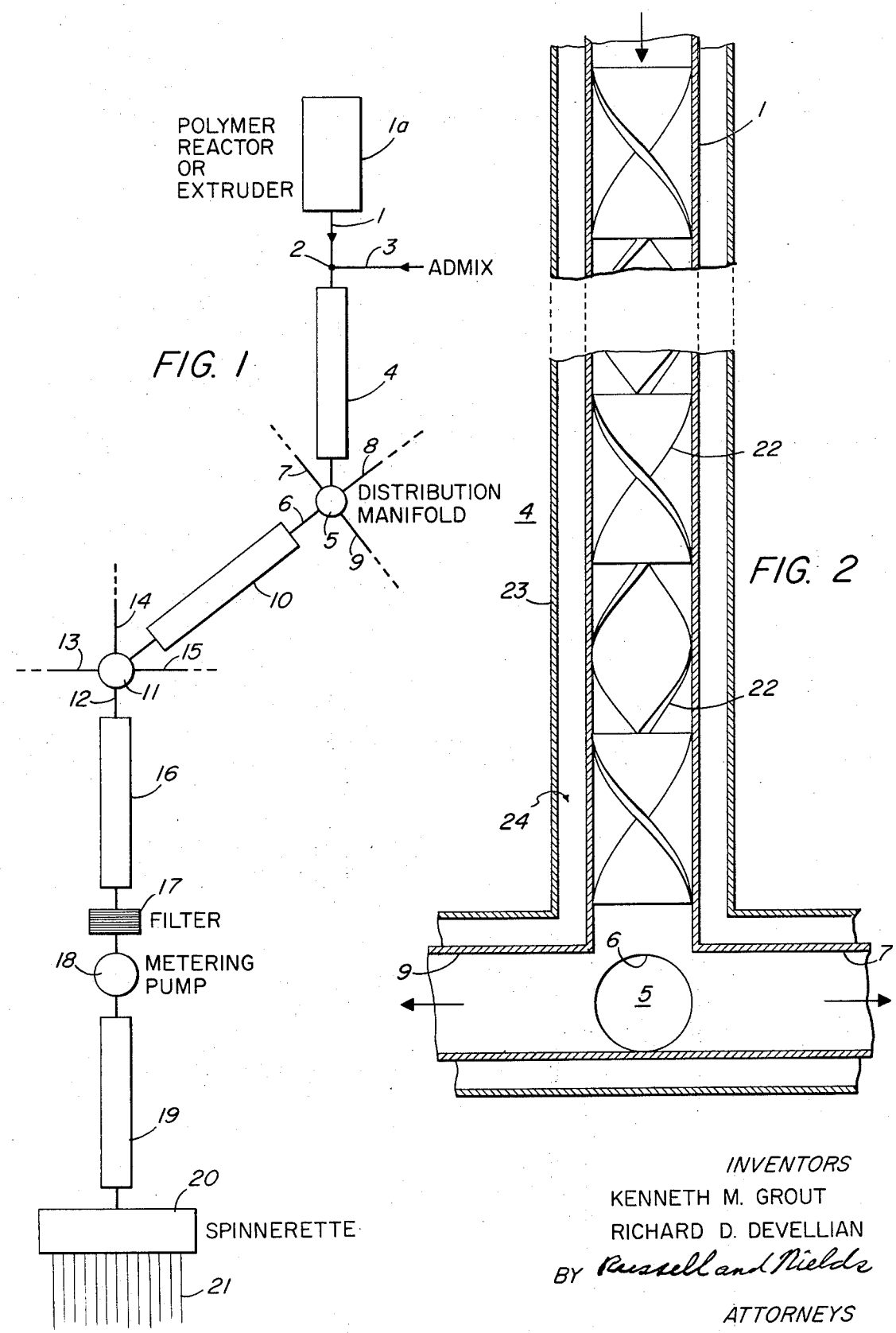

SYSTEM AND METHOD FOR DISTRIBUTING HIGHLY VISCOUS MOLTEN MATERIAL

BACKGROUND OF THE INVENTION

1. Field of the Invention

Systems for the distribution of molten highly viscous liquids, such as molten glass or molten polymer, in which the conduits of the system tend to produce undesirable variations in the properties of such liquids at their distribution points.

2. Problems of the Prior Art

A typical polymer system is one in which a polymer such as nylon, acrylonitrile, polyester or the like is distributed in molten form through a network of conduits to a plurality of spinnerettes where the polymer is extruded into filaments which in turn are spun into thread. The prior art has encountered the problem that the quality of the final filaments, for example as measured by tensile tests, has varied greatly even as between filaments coming from the multiple outputs of a single spinnerette. As a result the quality of the final product has been poorer than is desirable.

The principal reason for the above non-uniformity is that in all polymer processing there is a tendency for the polymer to degrade at the melt temperature as a function of time and temperature. The material involved has a high viscosity, and flows at low Reynolds numbers such that the flow is laminar. As the laminar flow profile of the polymer develops in the polymer stream, the velocity of the material at the center of the stream will tend to increase in value as compared to the velocity near the wall. Wall friction is responsible for the limitation of velocity of the polymer adjacent the wall. Since the viscous stream is developing a flow profile with the center advancing at a velocity greater than at the wall, a friction factor develops within the stream itself causing a temperature change in the polymer such that the center of the stream will increase in temperature and thus decrease in viscosity. This effect is progressive such that as the viscosity at the stream center increases it will tend to move faster thus increasing the temperature and further reducing the viscosity. In some cases exothermic reactions between components of the stream which contribute to the rise in temperature and the decrease in viscosity. It is obvious that a companion residence time distribution curve is being established at this time since that portion of the stream near the center of the pipe is proceeding through the system at a rate greater than that material close to the wall. Small differences in temperature between stream center and wall are responsible for large differences in the ultimate quality of the product. For example, with certain polymers a temperature difference between wall and center of stream of 10° C can account for as much as 100 percent change in quality of product as measured by tensile tests of the final filaments. When it becomes necessary to divide the stream, for example to supply multiple spinnerette, the stream will not divide uniformly but higher velocity components will pass into one stream while lower velocity components will pass into another stream, thus increasing the tendency of the system to generate large differences in the quality of the product.

The prior art has attempted to solve such problems by using externally driven mixing devices requiring high horsepower to drive them. Such dynamic blenders have, in themselves, exercised a degrading influence on the polymer. Several non-dynamic or stationary devices for producing a mixing action in the stream have been tried but deficiencies such as plugging, excessive pressure drop and inefficient mixing have limited the effectiveness of such devices.

Other systems, involving the distribution of high viscosity molten material such as glass in which the viscosity is temperature sensitive, have encountered problems similar to those involving molten polymers. The prior art principally has attempted to use dynamic stirring or mixing device, also with limited success.

SUMMARY OF THE INVENTION

The present invention substantially eliminates the limitations of the prior art by interposing ahead of each distribution point a mixer consisting of a conduit containing within it a plurality of curved sheet-like elements extending longitudinally of said conduit and each having a curvature to turn the direction of the material flowing through the conduit. The elements are arranged in alternating right and left-handed curvature groups (a group consisting of one or more elements) with the leading and trailing edges of adjacent elements in adjacent groups being disposed at a substantial angle to each other. The walls of the conduit are in contact with a heat exchange medium to control the temperature of the material in the conduit. This material is pumped at Reynolds numbers of less than one.

The above subjects the material, which is either a molten polymer or molten glass, to a process in which the heated molten material is rotated successively in alternating right and left handed directions transverse to the conduit, is subdivided in two between each such reversal, and in which the flow at the center of each rotating segment is accelerated and the flow at the edges of such segment is decelerated so that each particle of the material is caused to travel continuously from the center of such flow to the edges and back again and each such particle is subjected to substantially equal accelerations and decelerations to produce the same residence time for each particle in its travel through the conduit.

BRIEF DESCRIPTION OF THE DRAWINGS

In the annexed drawings:

FIG. 1 is a diagrammatic representative of one embodiment of this invention consisting of a system for distributing a molten polymer;

FIG. 2 is a cross-sectional view of a mixer incorporated in the system of FIG. 1;

DETAILED DESCRIPTION OF THE INVENTION

Figure 3:
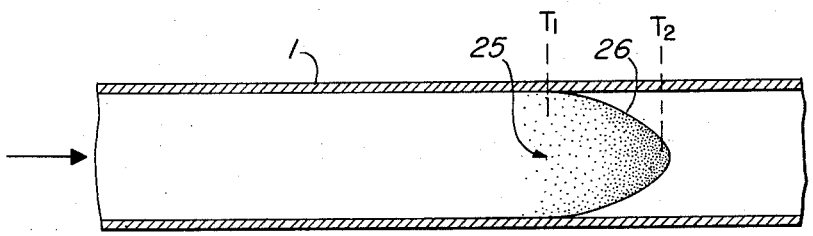
FIG. 3 represents the flow profile of a viscous material flowing in an empty pipe.

In the molten polymer distribution system shown diagrammatically in FIG. 1, a pipe 1 is fed from a standard reactor or extruder 1a with a supply of molten polymer. In a typical case, member 1a heats two thousand pounds per hour of the polymer to a temperature of about 300° C and supplies it to the inlet of pipe 1. If desired, additives may be injected into the system at junction point 2 through an admix pipe 3. The molten polymer stream then passes through the novel mixing structure of this invention at 4 and proceeds to multiple distribution manifold 5, for example a four-way manifold. The distribution arms 6, 7, 8 and 9 are each connected to a further distribution arrangement. This further arrangement is shown only for arm 6. The molten polymer stream flowing through arm 6 passes through another mixing structure 10 of the same type as mixing structure 4, to another distribution manifold 11, also typically a four-way manifold, having distribution arms 12, 13, 14 and 15. Each of these arms is connected to a further distribution system, only that connected to arm 12 being illustrated in FIG. 1. The molten polymer stream in arm 12 proceeds through another mixer 16, of the same type as 4 and 10, through a standard type of sand pack filter 17, a standard type of metering pump 18, and another of this invention's novel mixers 19 to a standard type of spinnerette 20 which extrudes and delivers a plurality of filamentary extrusions 21 of the polymer. While only two multiple arm distribution manifolds are shown in FIG. 1, it is to be understood that the typical system is usually more complex and may comprise 64 or more spinnerettes. Thus the molten polymer stream entering pipe 1 is subjected to many subdivisions and may travel through hundreds of feet of pipe before being discharged in the form of filaments from the spinnerettes.

In FIG. 2 the details of one of the mixing structures of this invention are illustrated, for example, mixture structure 4. This includes an extension of pipe 1, which is preferably cylindrical in cross-section, the molten polymer flow being shown as entering from the top of FIG. 2. The distribution manifold 5 is shown at the bottom of FIG. 2. Immediately upstream of the distribution manifold 5 there is disposed within the pipe 1a plurality of serially arranged curved sheet-like elements 22. Portions of pipe 1 and its surrounding structure are broken away to show only a few of such elements. Each of these elements is constructed of a flat sheet whose width may equal the inner diameter of pipe 1, and whose length is preferably one and one-half its width, but may be up to several times its width. Each element is so twisted that its upstream and downstream edges are at a substantial angle to each other. This angle may vary between about 60° and 210°. Also each successive element is twisted in the opposite direction with respect to its preceding element and the adjacent edges of successive elements are disposed at a substantial angle, preferably 90°, with respect to each other. Instead of reversing the twist of each successive element, a plurality of elements twisted in one sense may be followed by a plurality of elements twisted in the opposite sense. Therefore, the elements may be considered broadly as being arranged in alternating right-handed and left-handed curvature groups, it being understood that a group may consist of one or more elements.

Because of heat generated in the molten polymer during its flow through the system of FIG. 1, it is desirable to cool the pipes carrying the polymer so as to maintain the polymer at a desirable temperature, e.g. 300° C, by circulating a cooling medium through jackets around such pipes. In FIG. 2, the pipe 1 and the distribution arms 7 and 9 are shown surrounded by a jacketing structure 23 provided a space 24 surrounding the pipe 1 and arm 7 and 9 through which a liquid cooling medium at a temperature of, for example, 280° to 290° C is circulated.

Figure 4:
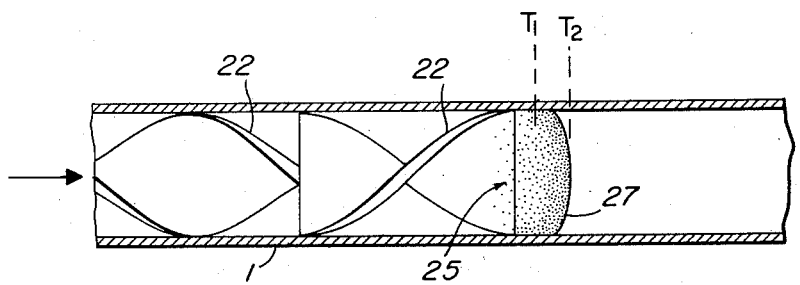
FIG. 4 represents the flow profile of a viscous material flowing through the mixer of this invention.

The qualitative results produced by the above structure may be illustrated in FIGS. 3 and 4. FIG. 3 shows an empty pipe 1 through which the highly viscous molten polymer 25 is flowing. Due to the forces, as explained above the polymer developes a parabolic flow profile 26 with the flow at the center of the pipe being substantially greater than that adjacent the walls. Of equal if not greater significance is the fact that that the temperature $T_2$ at the center of the flow tends to become excessively greater than the temperature $T_1$ in the flow adjacent the walls. Ideally it would be desirable to have the flow proceed as a plug flow at which each particle of the polymer would flow through the pipe at the same velocity as all other particles. In addition, the ideal condition would be to have $T_1$ equal to $T_2$. In FIG. 4, which illustrates the conditions produced by the use of the present invention, it will be seen that the molten polymer 25 develops a substantially different flow profile 27 which is quite flat and actually approximates plug flow. In addition the difference between $T_1$ and $T_2$ in FIG. 4 is substantially less than the difference between $T_1$ and $T_2$ in FIG. 3 and well within limits which substantially obviate the defects caused by an excessive difference between such temperatures. In addition these effects are produced with remarkably low pressure drops through the structure of the present invention.

Figure 5:
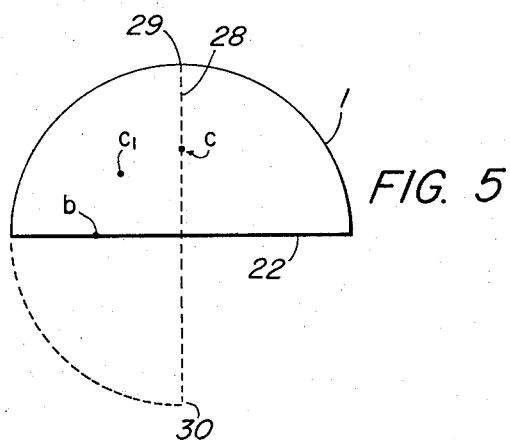
FIG. 5 is a diagram for explaining the acceleration and deceleration of molten material flowing through a mixer of this invention.

It is felt that the foregoing results are due to the following. The passage along one element 22 of the mixer described above consists of two semi-circular channels separated by a twisted boundary. A cross-section of one of such semi-circular channels is shown diagrammatically in solid lines in FIG. 5. As described above, the velocity of flow is at a maximum at the center $c$ and at a minimum at the boundaries of the channel, for example at point $b$. As the fluid flows through the element, each semi-circular slice of fluid is rotated through the angle of twist of the element 22, e.g. 180°. At the end of each element the fluid encounters the leading edge for the next element, which for example, may be perpendicular to its trailing edge. Such leading edge is shown by the dotted line 28 in FIG. 5. Thus the semi-circular slice of fluid at the end of each element is sheared into quarter-circular slices. As the fluid enters such next element, the two quarter slices reform into one new semi-circular slice. Such new semi-circular slice is illustrated as lying between points 29 and 30 in FIG. 5. Now it will be seen that the portion of fluid which flowed with maximum velocity at point $c$, finds itself at a boundary of the new semi-circular slice where it tends to flow at minimum velocity, while the fluid flowing with minimum velocity at point $b$ finds itself at the center of the new semi-circular slice where it tends to flow at maximum velocity. Therefore as the fluid flows past successive elements, various parts of the fluid are subjected to alternate accelerations and decelerations thus tending to make the total residence times of such points equal.

Not only is the fluid subjected to longitudinal variations in velocity, but the velocity vectors produced continually tend to force the materials from the center of the semi-circular slice outward to its outer walls. At the same time flow is caused to reverse its rotational direction at each element junction due to alternate right and left-hand configuration of the elements. Actual observation has shown that the fluid rotation in a given element is opposite to the direction in which said element is twisted. Thus in a clockwise twisted element, the half sections of fluid contained within that element are observed to rotate counter-clockwise while in a counter-clockwise twisted element the fluid rotates clock-wise. The effect is to cause the stream to be continuously and completely inverted radially such that every particle in the stream is forced from the center of the stream to the outer wall and back again on a continuing basis. Overall, every particle is thus given the same degree of acceleration and deceleration as it travels through the mixer to produce substantially the same residence time and substantially the same thermal history during its total travel through the system.

A further effect is present, caused by the varying length of path according to the position of a given particle on an element surface during its traverse through the elements. The path length is different around the element according to its position with respect to the center of the element. As a result it has been observed that spikes of fluid are constantly backward and forward mixing them further enhancing the effects described above.

In order to produce the desired effects a plurality of elements are required. A minimum number of about eight may be sufficient although a lesser number gives some degree of improvement over an empty pipe. Standard numbers of elements in each mixer located adjacent each distribution point may be of the order of twelve to fifteen or more.

To a certain extent, the problems involved in the distribution of molten polymers also exist in other highly viscous molten materials. For example, in the case of molten glass, the quality of the glass product is dependent upon the homogeneity of the glass as it is delivered to a distribution point. Lack of homogeneity may result in the appearance of chords or seeds which degrade the quality of the glass. The present invention can also be applied to the distribution of such molten glass. A system for glass distribution may involve a structure substantially as shown in FIG. 2 in which molten glass is introduced at the top inlet to pipe 1 and is distributed for further processing or forming at the lower end of pipe 1. Usually, in the case of glass, the heat transfer medium surrounding pipe 1 is at a higher temperature so as to keep the molten glass heated to its desired molten temperature. Due to the effects described in details above, the glass delivered at the lower end of pipe 1 has a remarkably high degree of homogeneity with a substantially complete absence of the chords or seeds which might otherwise adversely affect the quality of the product.

It is to be understood that the term "distribution outlet" as used in the specification and claims is to be broadly construed as including any outlet from which the material flows for further processing, whether or not the stream at such outlets is divided into a plurality of streams.

In various applications the heat exchange medium outside pipe 1 may take a variety of forms. For example it may be simply ambient air, or it may be heat insulating material or an electrical heating member.

It is to be understood that within the scope of the appended claims, various other modifications may be made in the details of the above embodiment as may become apparent to those skilled in the art.

What is claimed is:

1. A system for distributing highly viscous molten material whose viscosity is temperature sensitive comprising:
   a. an extruder including means for heating a flow of such material to a molten highly viscous state, outlet means, and means for extruding said material from said outlet means;
   b. a cylindrical conduit interconnecting said outlet means to a distribution outlet for distributing said material to a further processing means;
   c. said conduit containing within it, ahead of said distribution outlet, a plurality of curved sheet-like elements extending longitudinally of said conduit and each having a curvature to turn the direction of said material flowing through said conduit, said elements being arranged in alternating right and left-handed curvature groups with leading and trailing edges of adjacent elements in adjacent groups being disposed at a substantial angle to each other;
   d. the walls of said conduit being in heat transfer relationship with the material flowing through said conduit; and
   e. an additional conduit and distribution outlet connected in series to said first mentioned distribution outlet, said additional conduit and distribution outlet each being constructed as set forth for said first mentioned conduit and distribution outlet.

2. A system for distributing highly viscous molten material whose viscosity is temperature sensitive comprising:
   a. an extruder including means for heating a flow of such material to a molten highly viscous state, outlet means, and means for extruding said material from said outlet means;
   b. a cylindrical conduit interconnecting said outlet means to a distribution outlet for distributing said material to a further processing means;
   c. said conduit containing within it, ahead of said distribution outlet, a plurality of curved sheet-like elements extending longitudinaly of said conduit and each having a curvature to turn the direction of said material flowing through said conduit, said elements being arranged in alternating right and left-handed curvature groups with leading and trailing edges of adjacent elements in adjacent groups being disposed at a substantial angle to each other;
   d. the walls of said conduit being in heat transfer relationship with the material flowing through said conduit; and
   e. additional conduits and distribution outlets connected in series to said first mentioned distribution outlet, said additional conduits and distribution outlets each being constructed as set forth for said first mentioned conduit and distribution outlet.

3. A system as in claim 2 in which said material is a molten polymer and in which the last of said distribution outlets is connected to a filament spinnerette.

* * * * *